United States Patent [19]

Tsukahara et al.

[11] Patent Number: 5,159,376
[45] Date of Patent: Oct. 27, 1992

[54] AUTOMATIC FOCUS CONTROLLING APPARATUS

[75] Inventors: Daiki Tsukahara, Hiratsuka; Tadashi Otani, Tokyo; Shigemasa Sato, Chiba; Masaru Muramatsu, Kawasaki, all of Japan

[73] Assignee: Nikon Corporation, Tokyo, Japan

[21] Appl. No.: 705,521

[22] Filed: May 24, 1991

[30] Foreign Application Priority Data

May 29, 1990 [JP] Japan .................. 2-139003

[51] Int. Cl.⁵ .......................... G03B 13/36
[52] U.S. Cl. ..................... 354/400; 354/402; 354/195.1
[58] Field of Search ............ 354/400, 402, 406, 195.1

[56] References Cited

U.S. PATENT DOCUMENTS

| | | | |
|---|---|---|---|
| 4,416,523 | 11/1983 | Kawabata | 354/402 |
| 4,500,188 | 2/1985 | Kitagishi et al. | 354/406 |
| 4,994,841 | 2/1991 | Ishida et al. | 354/402 |
| 5,053,800 | 10/1991 | Ishida et al. | 354/402 |

FOREIGN PATENT DOCUMENTS 60-37443 8/1985 Japan .

Primary Examiner—Russell E. Adams
Attorney, Agent, or Firm—Shapiro and Shapiro

[57] ABSTRACT

An automatic focus controlling apparatus for a camera can set a lens position in a focus detection impossible state on the basis of previously obtained information associated with a distance to an object. The apparatus comprises a memory means for storing a focus controlling signal, and lens drive controlling means for, when an inoperative signal is output, controlling to drive a photographing lens in accordance with lens position information, and for, when the focus controlling signal is output, controlling to drive the photographing lens to a focus controlling position in accordance with the focus controlling signal. When the focus controlling signal is detected, the photographing lens is driven to a focus controlling position in accordance with the detected information. When the inoperative signal is output, the photographing lens is driven in accordance with the focus controlling signal stored in the memory means.

21 Claims, 10 Drawing Sheets

AUTOMATIC FOCUS CONTROLLING APPARATUS

BACKGROUND OF THE INVENTION

1. Field of the Invention

The present invention relates to an automatic focus controlling apparatus and, more particularly, to an automatic focus controlling apparatus which is improved such that a photographing lens can be set at an optimal position when information associated with a distance to an object cannot be obtained since, for example, an object has low contrast and low brightness.

2. Related Background Art

As a conventional automatic focus controlling apparatus of this type, an apparatus disclosed in Japanese Patent Publication No. 60-37443 is known. The automatic focus controlling apparatus drives a photographing lens to a predetermined position when information associated with a distance to an object cannot be obtained under the above-mentioned photographing condition (to be referred to as a focus detection impossible state hereinafter). Such a lens position must be arbitrarily set by a photographer in advance.

However, it is troublesome for a photographer to set the lens position, and it is difficult to determine a position to be set.

SUMMARY OF THE INVENTION

It is an object of the present invention to provide an automatic focus controlling apparatus which sets a lens position in a focus detection impossible state on the basis of previously obtained information associated with a distance to an object.

The present invention will be explained below with reference to FIG. 1 which shows a schematic view of the present invention. The present invention is applied to an automatic focus controlling apparatus comprising a focus controlling signal generating means 100 for generating a focus controlling signal (e.g., distance information according to a distance to an object) for driving a photographing lens to an optimal position, and outputting an inoperative signal when the focus controlling signal cannot be generated, and a lens drive controlling means 101 for driving the photographing lens to a focus controlling position on the basis of the output focus controlling signal.

In order to achieve the above object, the obtained focus controlling signal, and the lens drive controlling means 101 for, when the inoperative signal output, controlling to drive the photographing lens in accordance with lens position information, and for, when the focus controlling signal is output, controlling to drive the photographing lens to a focus controlling position in accordance with the focus controlling signal.

When the focus controlling signal is detected, the photographing lens is driven to a focus controlling position in accordance with the detected information. When the inoperative signal is output, the photographing lens is driven in accordance with the focus controlling signal stored in the memory means 102.

According to the present invention, the previously detected focus controlling signal value is stored, and when a focus controlling signal cannot be generated, the photographing lens is driven on the basis of the stored focus controlling signal. Therefore, a position where the photographing lens is to be moved need not be input in advance when a focus controlling signal cannot be generated.

BRIEF DESCRIPTION OF THE DRAWINGS

FIGS. 2 to 6 are views for explaining an embodiment of an automatic focus controlling apparatus according to the present invention, in which FIG. 2 is a front view of a camera, FIG. 3 is a block diagram showing the overall arrangement of a control system, and FIGS. 4 to 6 are flow charts showing a processing sequence;

DETAILED DESCRIPTION OF THE PREFERRED EMBODIMENTS

An embodiment of the present invention will be described below with reference to FIGS. 2 to 6. In this embodiment, the present invention is applied to a lens shutter camera.

Figure 1:
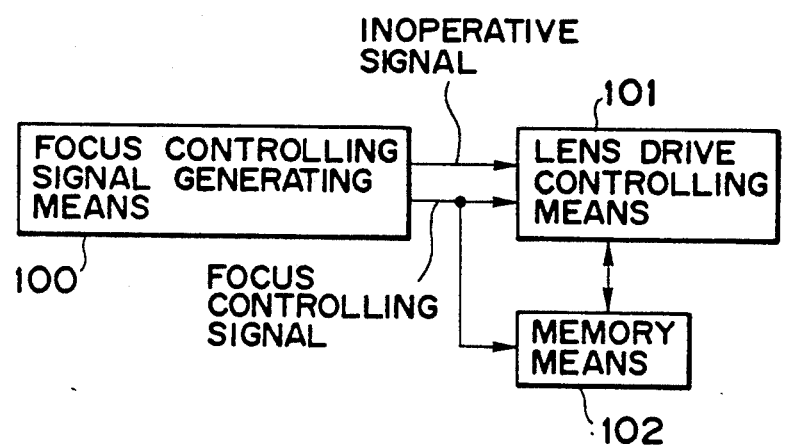
FIG. 1 is a schematic diagram of the present invention.
Figure 2:
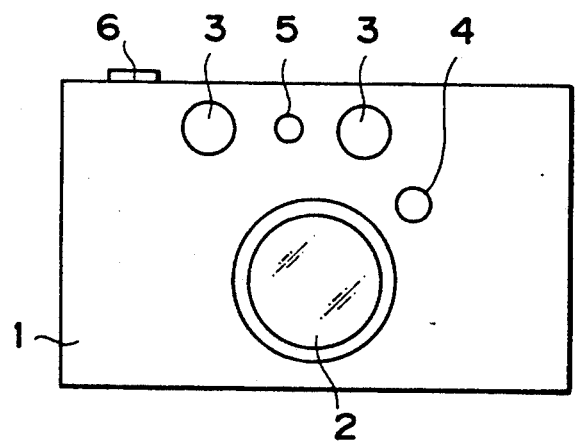

FIG. 2 is a front view of a lens shutter camera. A photographing lens 2 is mounted on a camera main body 1. A pair of ranging windows 3 are formed on the camera main body 1. For example, in a known external light triangular passive ranging system, a pair of object images obtained through the pair of windows are received, and a distance to an object is detected on the basis of the received optical signals. An auxiliary light emitting window 4 is formed on the camera main body 1. When a ranging operation cannot be performed, e.g., when an object has low brightness, auxiliary light is emitted from the window 4 to an object. A photometering window 5 is formed on the camera main body 1, and a release button 6 is arranged on the upper surface of the main body 1.

Figure 3:
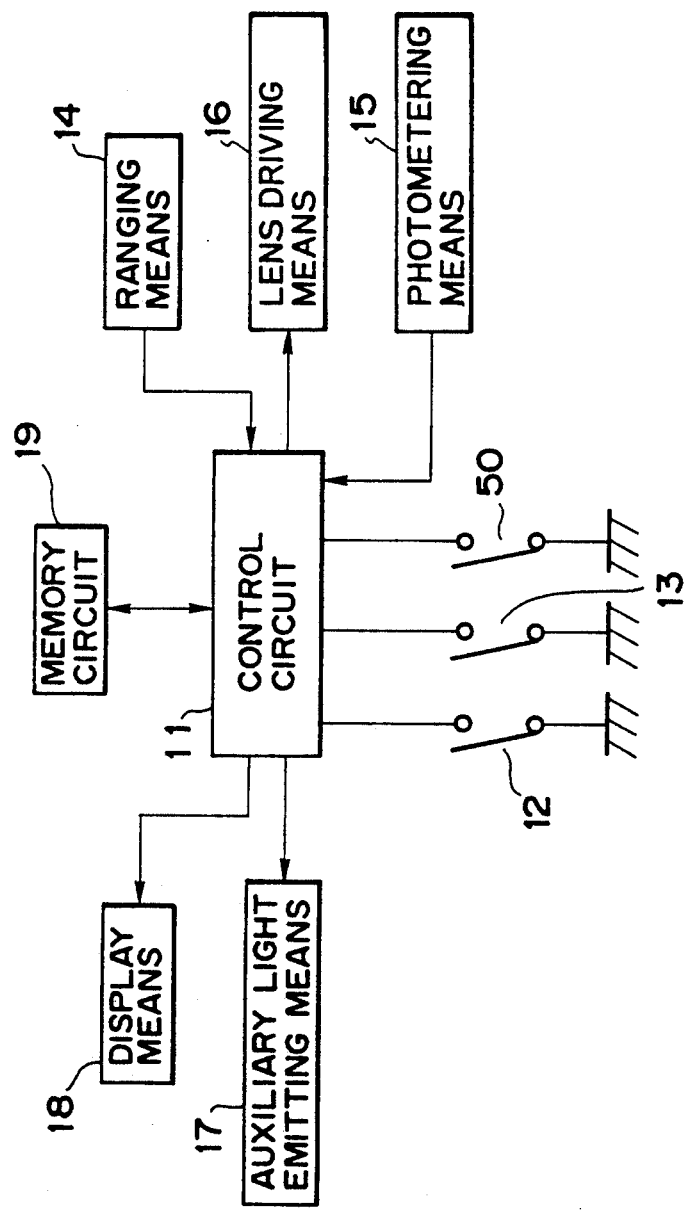

FIG. 3 shows the overall arrangement of a control circuit. A control circuit 11 including a microcomputer is connected to a half-depression switch 12 which is turned on upon a half-depression operation of the release button 6, a full-depression switch 13 which is turned on upon a full-depression operation of the release button 6, and a power switch 50 which is turned on every time a button (not shown) is depressed, and alternately switches a power supply ON/OFF state to the entire circuit. A ranging means 14 and a photometering means 15 are connected to input terminals of the control circuit 11. A lens driving means 16 including a motor for driving the photographing lens to a focus controlling position, an auxiliary light emitting means 17 including a light source for emitting auxiliary light from the auxiliary light emitting window 4, and a display means 18 for displaying various kinds of photographing information are connected to output terminals of the control circuit 11. The display means 18 includes an LED which is turned on when a distance to an object (to be referred to as a photographing distance) is detected by the ranging means 14. Furthermore, the control circuit 11 is connected to a memory circuit 19 for storing photographing distance information or data as lens position data used in a focus detection impossible state, as will be described later.

A photographing operation sequence will be described below with reference to FIGS. 4 to 6.

Figure 4:
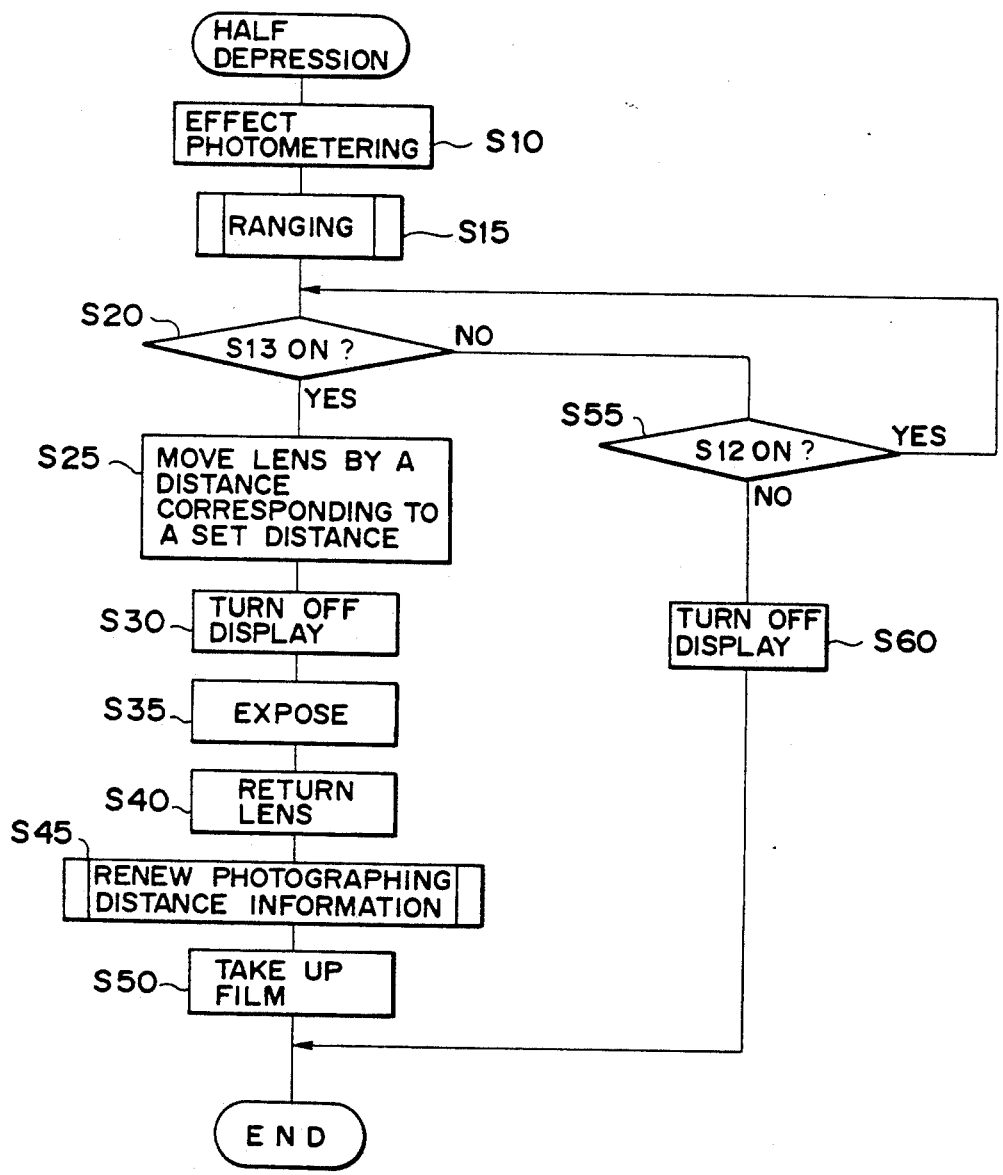

When the half-depression switch 12 is turned on, the program shown in FIG. 4 is started. In step S10, known photometering processing is executed by the photometering means 15, and an F-number, a shutter speed, an ON/OFF state of a flash device, and the like are determined. Thereafter, the flow advances to step S15. In step S15, ranging processing is executed by the ranging means 14 in a sequence to be described later, thereby setting distance data. If it is determined in step S20 that the full-depression switch 13 is ON, the flow advances to photographing processing starting from step S25; otherwise, the flow advances to step S55. If it is determined in step S55 that the half-depression switch 12 is ON, the flow returns to step S20; otherwise, display data on the display means 18 is turned off in step S60, thus ending processing.

When the flow advances to step S25, the photographing lens 2 is driven by the lens driving means 16 by a distance corresponding to set distance data. In step S30, display data on the display means 18 is turned off. Thereafter, in step S35, an exposure operation is performed using an exposure value based on a photometering value, and a photographing operation is performed. After the photographing operation, the photographing lens 2 is returned to an initial position in step S40. In step S45, photographing distance data in the memory circuit 19 is renewed in a sequence to be described later, and in step S50, a film is taken up, thus ending the processing.

Figure 5:
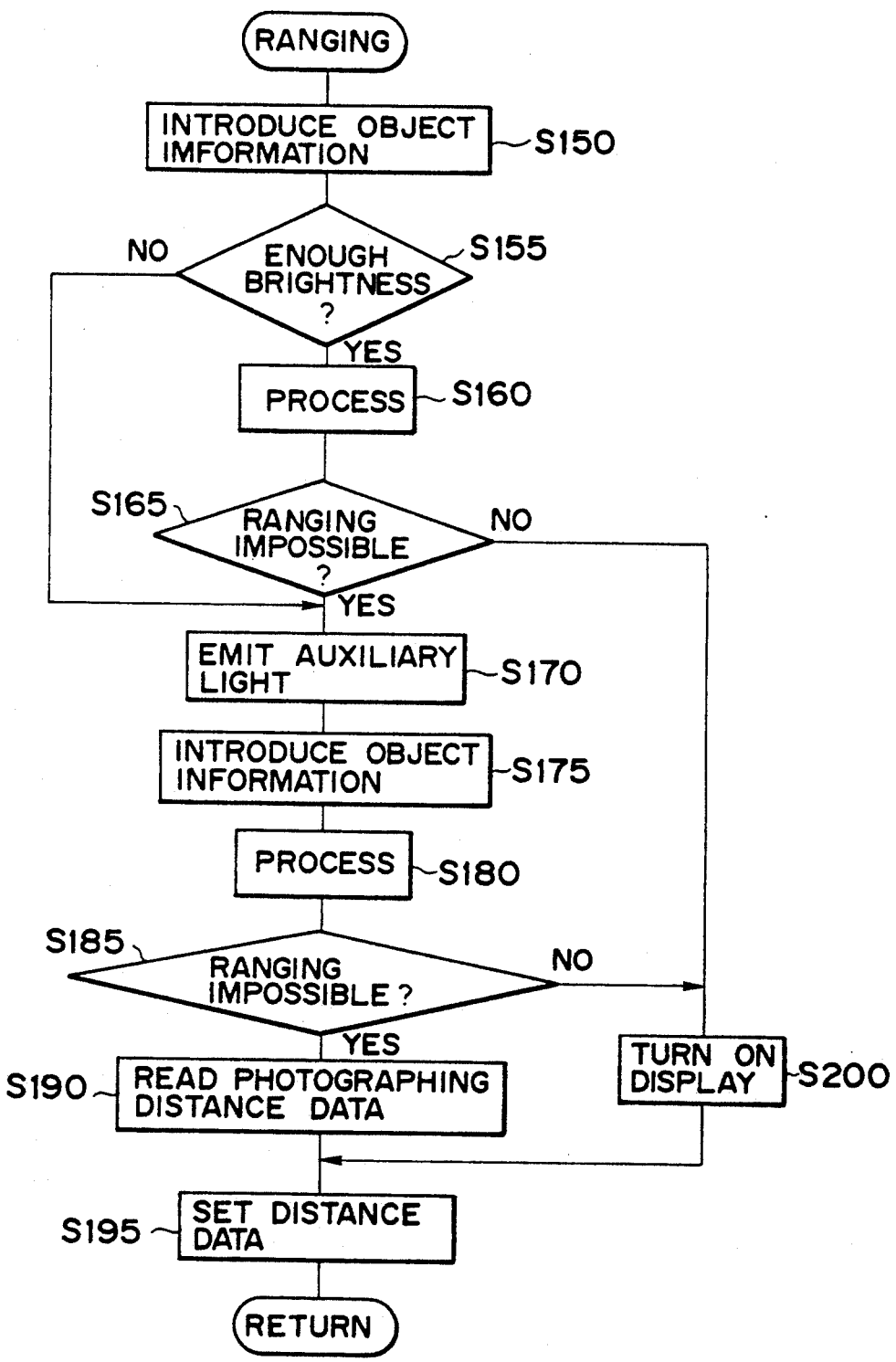

FIG. 5 shows a detailed sequence of the ranging processing in step S15 shown in FIG. 4.

In step S150, object information is fetched from a light-receiving element constituting the ranging means 14. If it is determined in step S155 that the object information has brightness enough to obtain a photographing distance, the flow advances to step S160; otherwise, the flow jumps to step S170. In step S160, a photographing distance is calculated on the basis of the object information fetched in step S150.

If it is determined in step S165 that an object has low contrast, and a photographing distance cannot be obtained, the auxiliary light emitting means 17 is driven in step S170 to emit auxiliary light to the object. As the auxiliary light, light may be simply emitted or pattern light having contrast may be emitted.

In step S175, object information is fetched again from the light-receiving element while emitting the auxiliary light, and in step S180, a photographing distance is calculated. It is checked in step S185 if the photographing distance is obtained. If it is determined in step S185 that the photographing distance can be obtained, the flow advances to step S200; otherwise, the flow advances to step S190. In step S190, photographing distance data is read out from the memory circuit 19. In step S200, a display (e.g., an LED) indicating that ranging is possible is turned on in the display means 18. Finally, in step S195, distance data is set, and the control returns to the program shown in FIG. 4.

Figure 6:
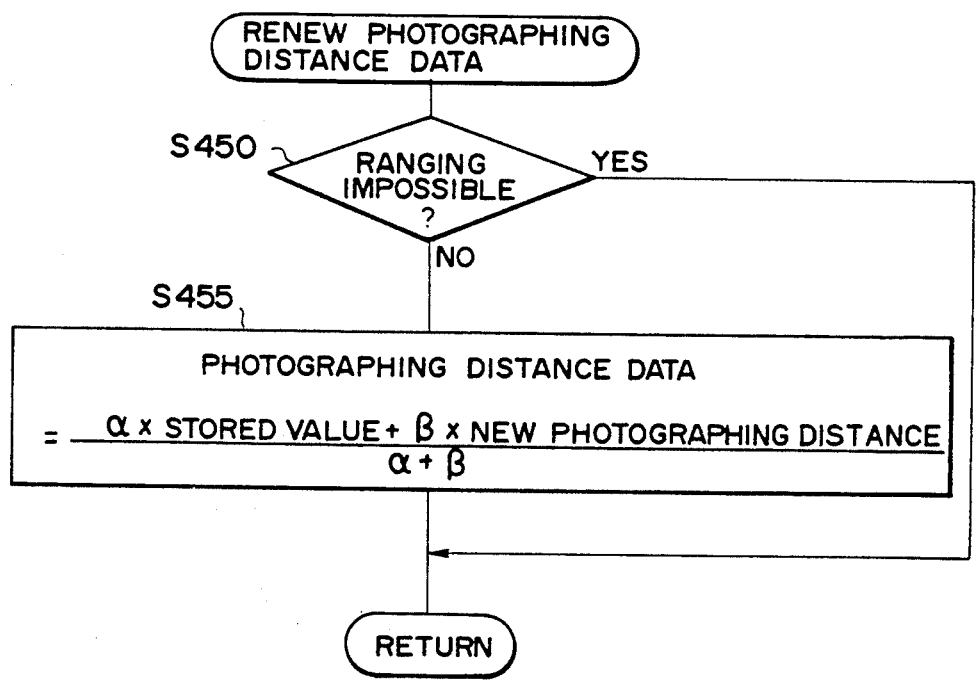

FIG. 6 shows a program of a detailed sequence for renewing photographing distance data in the memory circuit 19 in step S45 shown in FIG. 4.

In step S450, it is checked if a photographing distance is obtained. Only when the photographing distance is obtained, the stored value of the photographing distance data is renewed by the following formula in step S455, and the control returns to the program show in FIG. 4.

$$\text{Stored Value} = \frac{\alpha \times \text{Stored Value} + \beta \times \text{New Photographing Distance}}{\alpha + \beta}$$

where $\alpha$ and $\beta$ are the weighting coefficients, and are positive real numbers.

With the above-mentioned sequence, when a photographing distance cannot be obtained, since the photographing lens is driven based on photographing distance data stored in the memory circuit 19, an operator of a camera need not input information for determining a moving position of the photographing lens. Since the destination of the photographing lens in a ranging impossible state is determined by an arithmetic mean value of previously detected photographing distances, a probability of setting the photographing lens at a focus controlling position is higher than a conventional automatic focus controlling apparatus.

When the ranging operation is attained, the LED of the display means 18 is turned on, and when the ranging operation is impossible, the LED is kept OFF. Therefore, a photographer can know a photographing distance for driving the photographing lens.

Figure 10:
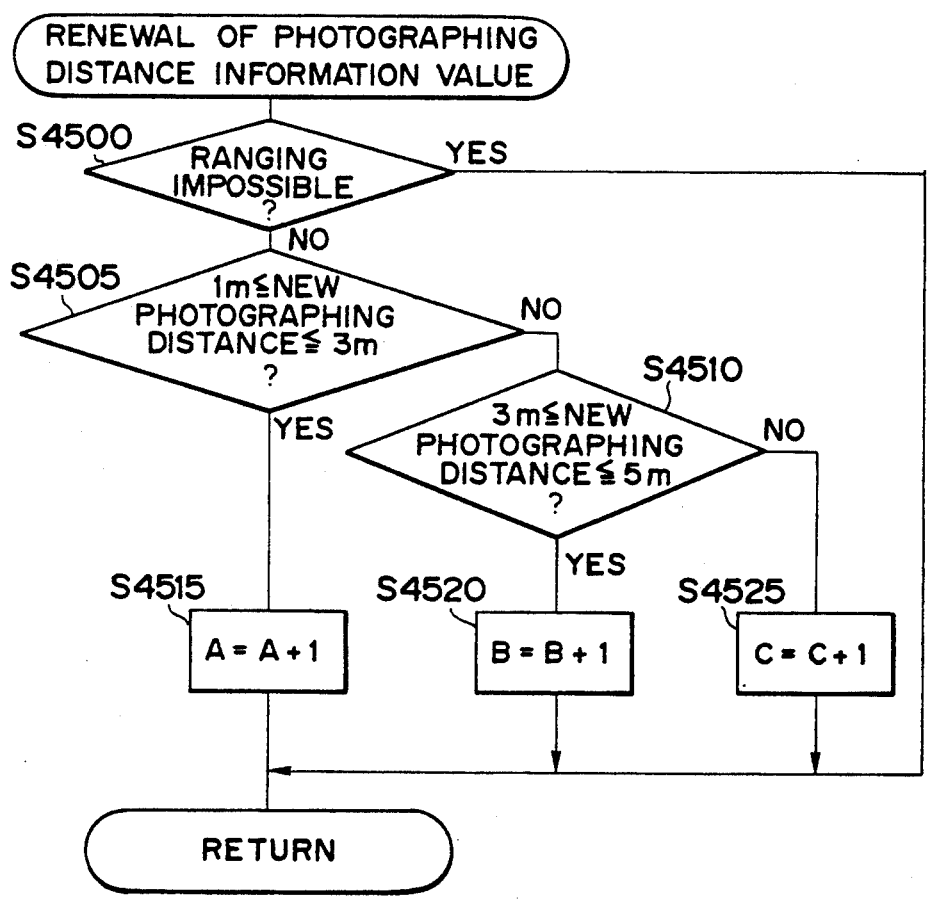
FIGS. 10 and 11 are flow charts showing processing sequences of still another embodiment.
Figure 11:
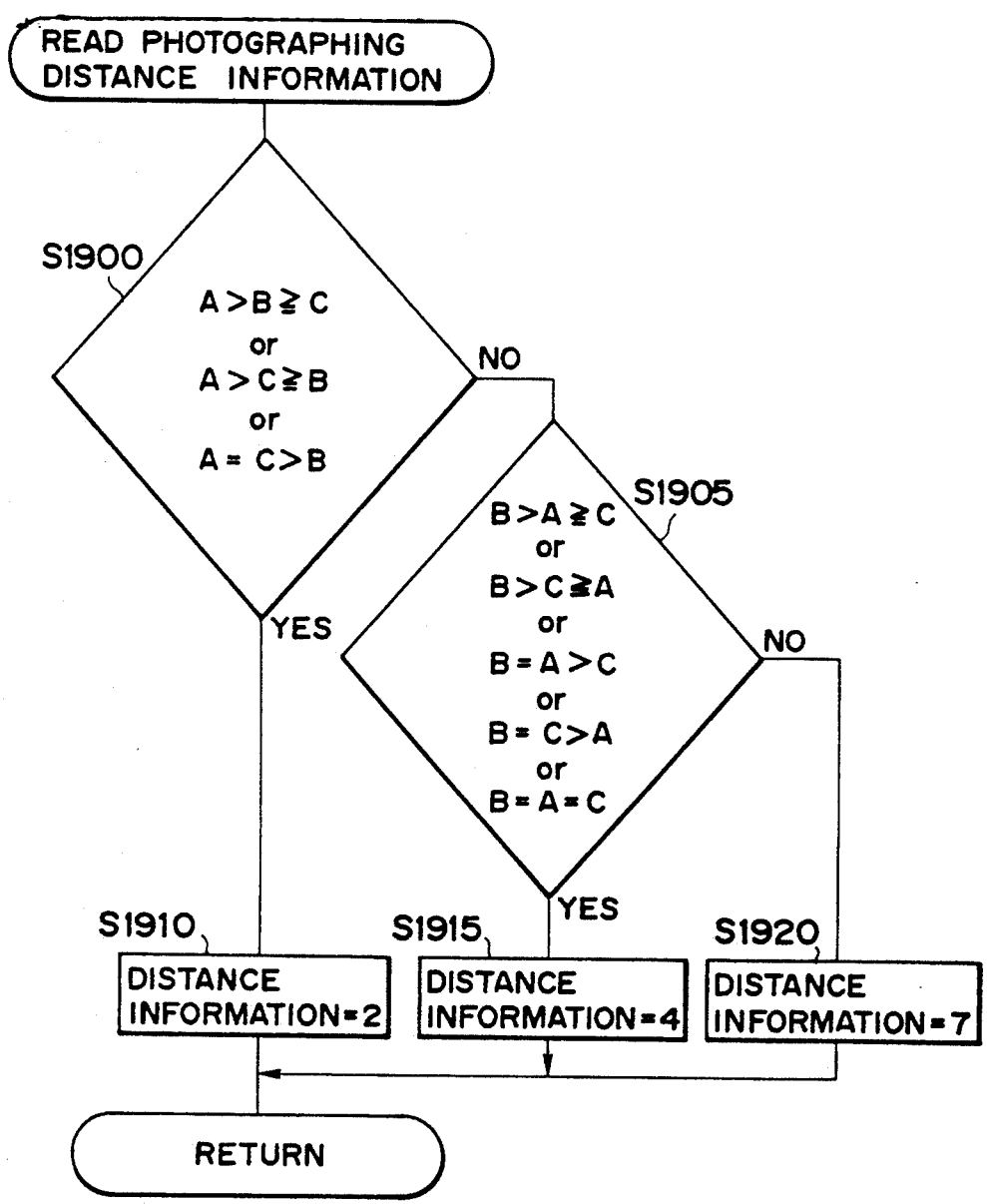

FIGS. 10 and 11 show programs corresponding to FIG. 4 in another embodiment.

In this embodiment, previous photographing distances are classified to a near distance range (e.g., 1 to 3 m), a middle distance range (3 to 5 m), and a far distance range (more than 5 m), corresponding stored values in the memory circuit 19 are renewed, and the most frequently used photographing distance during ranging processing is obtained to perform lens driving.

FIG. 10 shows a program of a detailed sequence for renewing photographing distance data in the memory circuit 19 in step S45 shown in FIG. 4 in this embodiment.

In step S4500, it is checked if a photographing distance is obtained. Only when the photographing distance is obtained, a stored value of photographing distance data is renewed by processing in steps S4505 to S4525, and the control returns to the program shown in FIG. 4.

In step S4505, it is checked if the photographing distance falls within the near distance range (1 to 3 m). If YES in step S4505, the flow advances to step S4515; otherwise, the flow advances to step S4510.

In step S4510, it is checked if the photographing distance falls within the middle distance range (3 to 5 m). If YES in step S4510, the flow advances to step S4520; otherwise, the flow advances to step S4525.

In step S4515, a count (e.g., A) representing photographing distance data in the near distance range is incremented by one. In step S4520, a count (e.g., B) representing photographing distance data in the middle distance range is incremented by one. In step S4525, a count (e.g., C) representing photographing distance data in the far distance range is incremented by one.

FIG. 11 shows a program of a detailed sequence for reading out photographing distance data from the memory circuit 19 in step S190 to which the flow advances when no photographing distance is obtained.

In steps S1900 and S1905, photographing distance data having a maximum count is detected from the photographing distance data (the near distance range A, the middle distance range B, and the far distance range C) in the memory circuit 19. It is checked in step S1900 if A is the maximum value, or A and C are equal to each other, and are larger than B. If one of the above-mentioned conditions is satisfied, the flow advances to step S1910; otherwise, the flow advances to step S1905. It is checked in step S1905 if B is maximum, or B and A or C are equal to each other, and are larger than the remaining one, or A, B, and C are equal to each other. If one of the above-mentioned conditions is satisfied, the flow advances to step S1915; otherwise, the flow advances to step S1920.

When the flow advances to step S1910, distance data of 2 m is read out as an intermediate distance in the near distance range of 1 to 3 m. When the flow advances to step S1915, distance data of 4 m is read out as an intermediate distance in the middle distance range of 3 to 5 m. When the flow advances to step S1920, distance data of 7 m is read out as an intermediate distance in the far distance range. Thereafter, the flow returns to step S195 in FIG. 5.

In this embodiment, since the destination of the photographing lens in a ranging impossible state is determined on the basis of most frequently stored distance data of stored data of previously detected photographing distances, the photographing lens is set at the most frequently photographed focus controlling position. As a result, the photographing lens can be driven while placing an importance on previous data as compared to a conventional automatic focus controlling apparatus.

As the stored values in the memory circuit 19 in the above embodiment, when the power switch 50 is turned on, a predetermined value (e.g., B=1) is initially written in a stored value in the memory circuit 19, and thereafter, the stored value is renewed in every photographing operation. The stored value is held after the power supply is cut when the power switch 50 is turned off. When one of the counts A, B, and C exceeds 1,000, the lowest digit, i.e., a ones digit of each count is cut to decrease the counts. More specifically, when A=95, B=1,000, and C=3, A =9, B=100, and C=0 are set. However, the present invention is not limited to this. For example, when one of the counts A, B, and C exceeds 1,000, the count exceeding 1,000 may be set to be 10, and the remaining two counts may be set to be 0. More specifically, when A=27, B=1,000, and C=910, A=0, B=10, and C= 0 are set. Alternatively, when the power switch 50 is turned off, the stored values may not be held. Every time the power switch 50 is turned on, a predetermined value (e.g., B=1) may be initially written, and the stored value may be renewed in every photographing operation.

The present invention is not limited to the boundaries of the near, middle, and far distance ranges set in this embodiment. Distance data to be read out is not limited. When two of the counts A, B, and C have a maximum value, the priority is determined to be B>A>C in this embodiment. However, the present invention is not limited to this. Furthermore, the number of boundaries is set to be 3, but may be increased.

Figure 7:
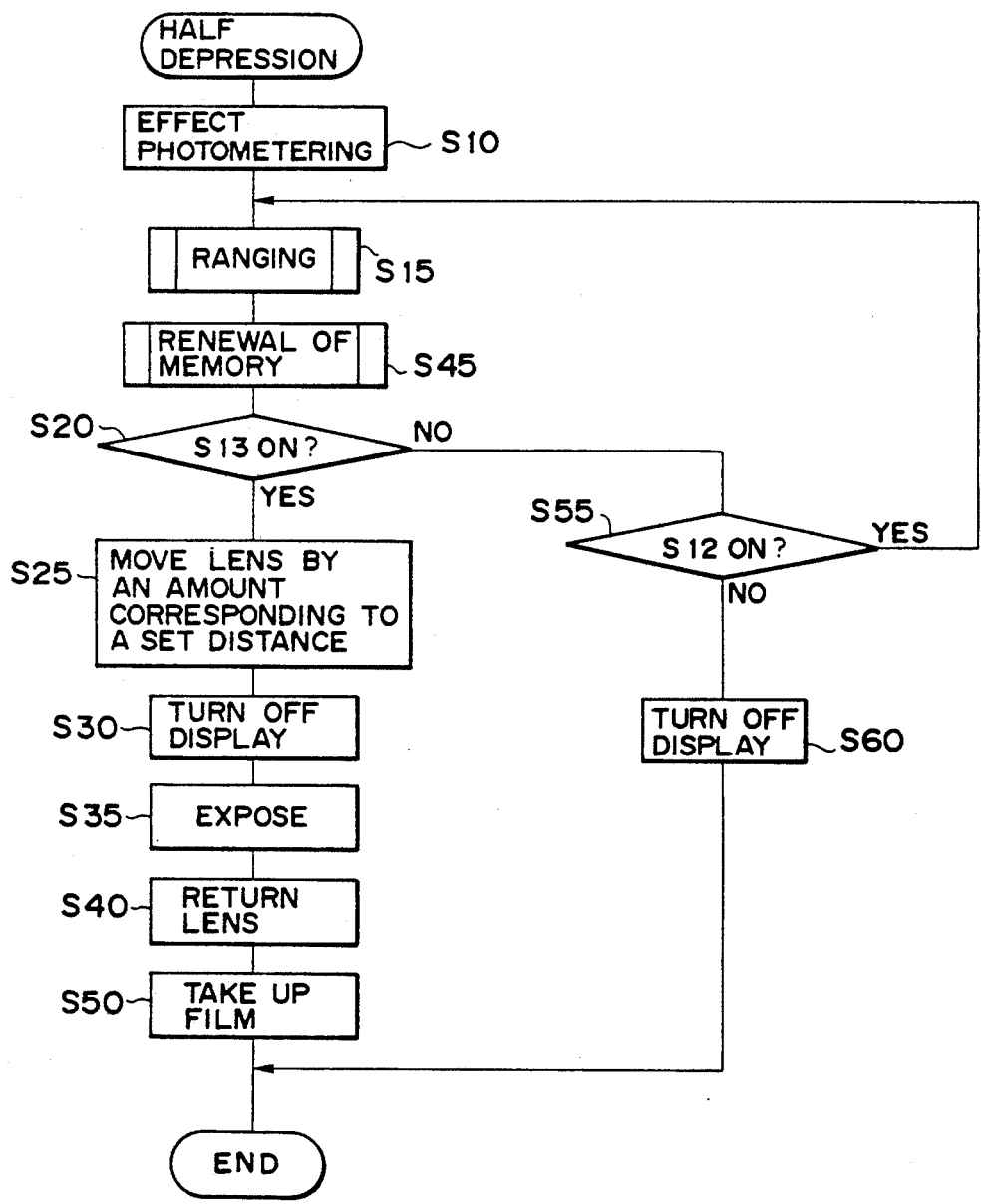
FIGS. 7 to 9 are flow charts showing processing sequences of other embodiments.

FIG. 7 shows a program corresponding to FIG. 4 in still another embodiment.

In this embodiment, a ranging operation is repetitively performed during a half-depression operation, and when a photographing distance is obtained, the stored value in the memory circuit 19 is sequentially renewed in step S45. In this case, no lens driving operation is performed during a half-depression operation. Note that a description of steps in FIG. 7 denoted by the same reference numerals as in FIG. 4 will be omitted.

Figure 8:
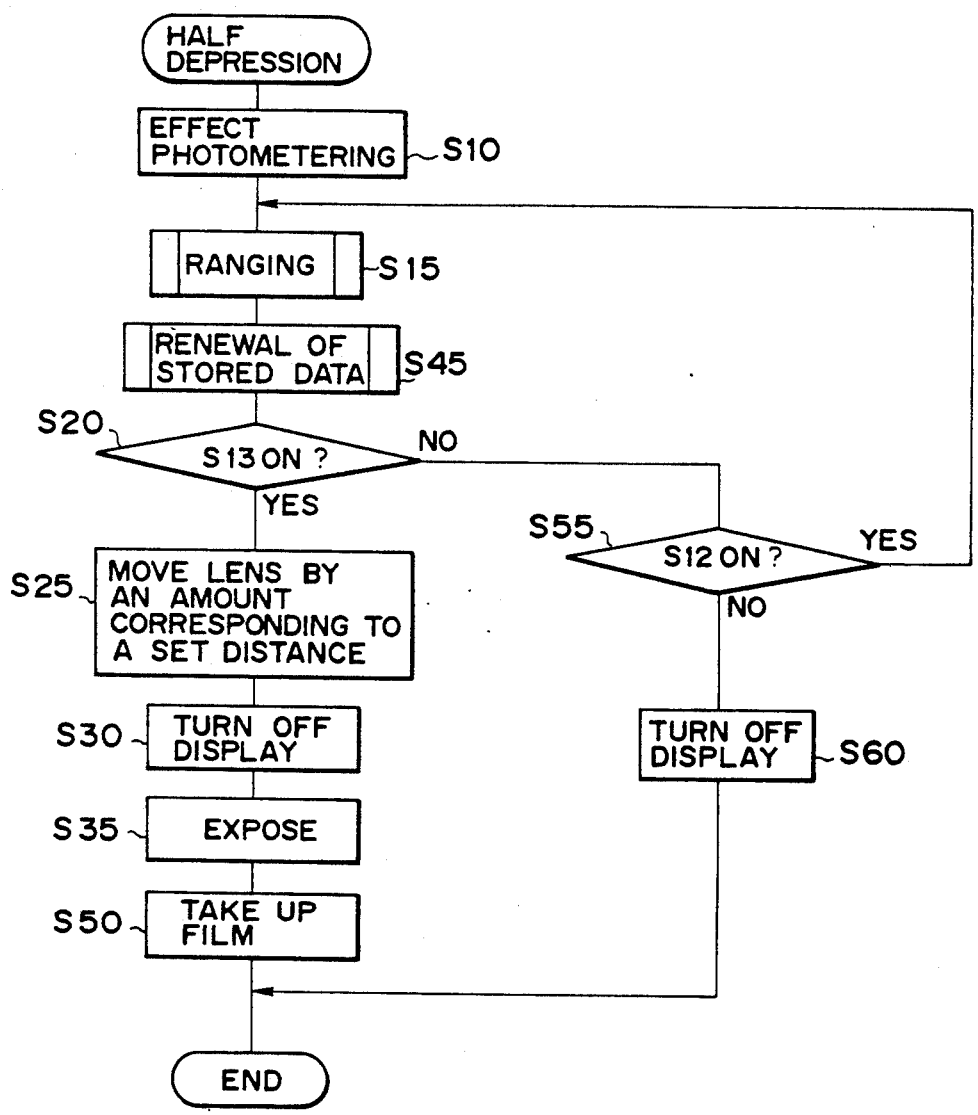
Figure 9:
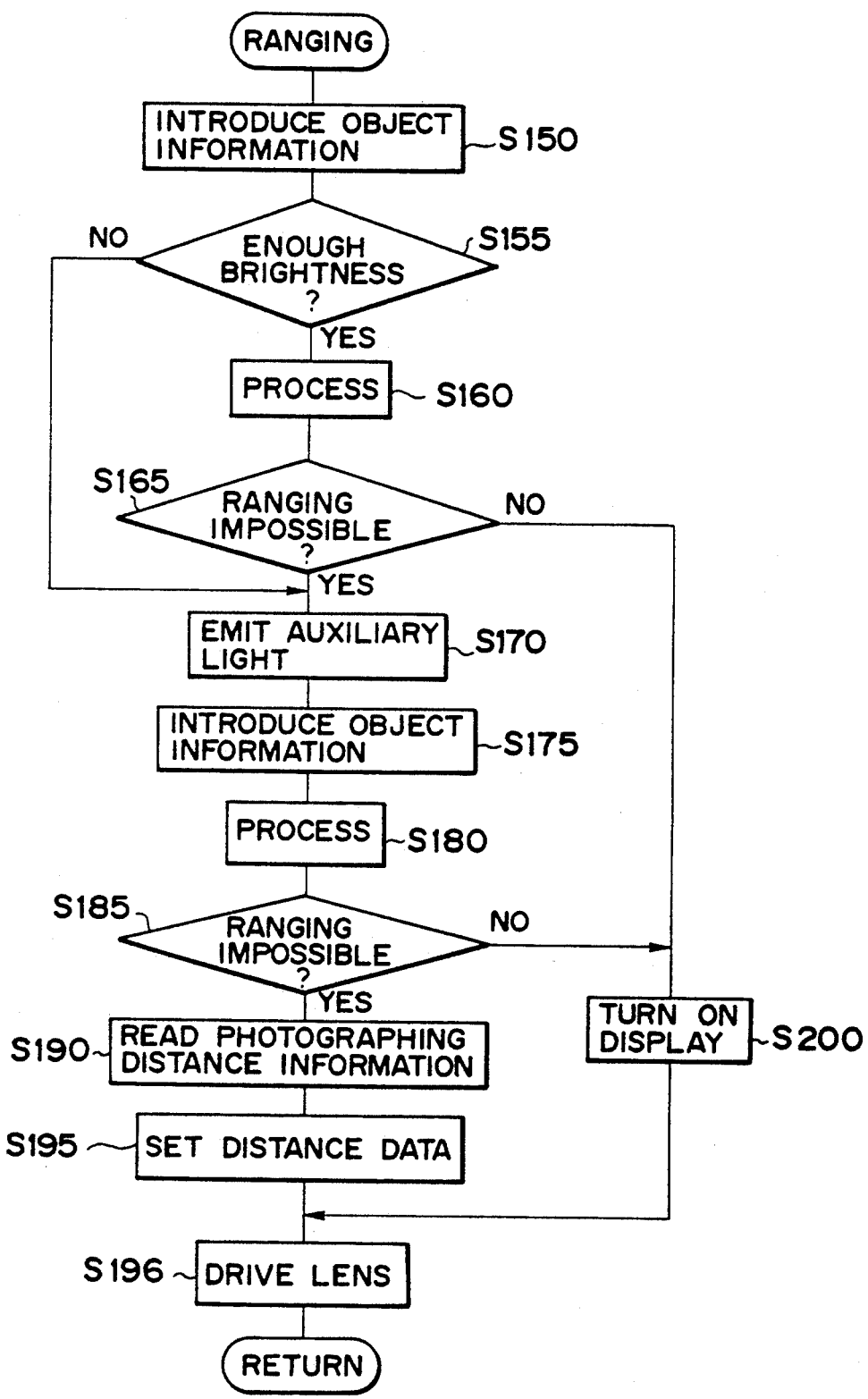

FIGS. 8 and 9 show sequences when the present invention is applied to a camera of a type for performing a lens driving operation during ranging processing. The same reference numerals in FIGS. 8 and 9 denote the same steps as in FIGS. 4 and 5, and a detailed description thereof will be omitted.

The ranging means 14 of this embodiment has, e.g., a TTL focus detection apparatus of a phase difference system. A value obtained in step S160 or S180 represents a shift amount (defocus amount) between an image plane of an object by the photographing lens, and a prospective focal plane conjugate with a film surface. Therefore, since the defocus amount does not directly represent a photographing distance, the photographing distance is calculated on the basis of the focal length and the position of the photographing lens, and the defocus amount, and is stored in the memory circuit 19.

In FIG. 8, step S40 in FIG. 7 is omitted, and in FIG. 9, step S196 is added to the ranging processing sequence to execute a lens driving operation. In this case, if a defocus amount is obtained in step S160, as described above, the lens driving operation can be performed based on the obtained value. For this reason, the flow advances from step S165 to step S196 via step S200.

Note that photographing distance data to be stored in the memory circuit 19 may be calculated by an algorithm other than the above-mentioned formula. For example, a simple arithmetic mean value may be used (i.e., $\alpha=\beta=1$). The stored value in the memory circuit 19 may be sequentially renewed using a photographing distance obtained in the immediately preceding ranging processing without performing the calculation like in the above-mentioned formula (i.e., $\alpha=0$, $\beta=1$). In this manner, the photographing lens can be driven on the basis of a photographing distance obtained in the immediately preceding ranging processing in a ranging impossible state.

The values $\alpha$ and $\beta$ may be changed in accordance with the number of times of the release operation. For example, in an early use of a camera, $\alpha=1$ and $\beta=1$ are set. When the number of times of the release operation exceeds 1,000, $\alpha=10$ and $\beta=1$ are set to place a more importance on previous data. Furthermore, data to be stored may be a lens position, and the ranging means is not limited to the above-mentioned external light triangular passive system, or the TTL focus detection system.

The stored value in the memory circuit 19 in the when the power switch 50 is turned off. However, the present invention is not limited to this. For example, every time the power switch is turned on, a predetermined value (e.g., a normal focal length) may be initially written, and the stored value may be renewed in every photographing operation.

In the arrangement of the above embodiment, the ranging means 14 constitutes distance data detection means, the lens driving means 16 constitutes lens driving means, the memory circuit 19 constitutes memory means, and the control circuit 11 constitutes lens drive controlling means.

What is claimed is:

1. An automatic focus controlling apparatus including:
   a photographing lens;
   focus controlling signal generating means for generating a focus controlling signal for driving said photographing lens to an in-focus position, and for, when the focus controlling signal cannot be generated, outputting an inoperative signal;

memory means for storing the focus controlling signal, stored data in said memory means being able to be renewed; and photographing lens driving means for, when the focus controlling signal is output, driving said photographing lens on the basis of the focus controlling signal, and for, when the inoperative signal is output, driving said photographing lens on the basis of the stored data stored before the inoperative signal is output.

2. An apparatus according to claim 1, wherein the focus controlling signal is a signal representing an object distance.

3. An apparatus according to claim 1, wherein said memory means stores the focus controlling signal every time said focus controlling signal generating means generates the focus controlling signal.

4. An apparatus according to claim 2, wherein the focus controlling signal is a signal representing a defocus amount as a magnitude of a shift amount between an image plane of an object by said photographing lens, and a film surface.

5. An apparatus according to claim 1, wherein when the focus controlling signal is output to drive said photographing lens, and a photographing operation is performed after a driving operation of said photographing lens is stopped, said memory means stores the focus controlling signal which drives said photographing lens to the stop position before said focus controlling signal generating means generates the next focus controlling signal or the next inoperative signal.

6. An apparatus according to claim 5, wherein when the focus controlling signal is output to drive said photographing lens, and a photographing operation is performed after a driving operation of said photographing lens is stopped, said memory means rewrites the stored data with only the focus controlling signal which drives said photographing lens to the stop position before said focus controlling signal generating means generates the next focus controlling signal or the next inoperative signal.

7. An apparatus according to claim 5, wherein said memory means can store a plurality of focus controlling signals, and when the inoperative signal is output, said photographing lens driving means drives said photographing lens on the basis of the stored data stored before the inoperative signal is output.

8. An apparatus according to claim 7, wherein said memory means stores the focus controlling signal in every photographing operation, and said apparatus further includes:

memory controlling means for, when the inoperative signal is output, reading out the plurality of focus controlling signals stored in said memory means before the inoperative signal is output.

9. An apparatus according to claim 8, wherein said photographing lens driving means drives said photographing lens on the basis of the most frequently stored focus controlling signal of the plurality of focus controlling signals read out by said memory control means.

10. An apparatus according to claim 5, further including:

memory control means for, when the inoperative signal is output, reading out the focus controlling signal stored in said memory means before the inoperative signal is output.

11. An apparatus according to claim 10, wherein when said focus controlling signal generating means outputs a new focus controlling signal to drive said photographing lens, and a photographing operation is performed after a driving operation of said photographing lens is stopped, said memory controlling means reads out the focus controlling signal stored in said memory means, and generates a focus controlling signal to be stored in said memory means on the basis of the readout focus controlling signal and the new focus controlling signal for the photographing operation output from said focus controlling signal generating means.

12. An apparatus according to claim 11, wherein the focus controlling signal to be stored in said memory means is generated before said focus controlling signal generating means generates the next focus controlling signal or the next inoperative signal.

13. An apparatus according to claim 10, wherein when said focus controlling signal generating means outputs a new focus controlling signal to drive said photographing lens, and a photographing operation is performed after a driving operation of said photographing lens is stopped, said memory controlling means reads out the focus controlling signal stored in said memory means, and generates a focus controlling signal to be stored in said memory means on the basis of the readout focus controlling signal and the new focus controlling signal for the photographing operation output from said focus controlling signal generating means before said focus controlling signal generating means generates the next focus controlling signal or the next inoperative signal, and said memory means stores the focus controlling signal generated by said memory controlling means to renew the stored data.

14. An apparatus according to claim 13, wherein said memory controlling means generates the focus controlling signal calculated by multiplying the focus controlling signal read out from said memory means with a first coefficient, and multiplying the new focus controlling signal output from said focus controlling signal generating means with a second coefficient.

15. An apparatus according to claim 14, wherein the first and second coefficients are positive real numbers, and the focus controlling signal is generated by adding a value obtained by multiplying the focus controlling signal read out from said memory means with the first coefficient and a value obtained by multiplying the new focus controlling signal output from said focus controlling signal generating means with the second coefficient, and dividing the sum with a sum of the first and second coefficients.

16. An apparatus according to claim 14, wherein the first and second coefficients are equal to each other.

17. An apparatus according to claim 14, wherein the first coefficient is larger than the second coefficient.

18. An apparatus according to claim 14, wherein the first coefficient is smaller than the second coefficient.

19. An apparatus according to claim 14 or 15, wherein the first coefficient is changed from a value equal to or smaller than the second coefficient to a value larger than the second coefficient in accordance with the number of times of completed photographing operations.

20. An apparatus according to claim 14 or 15, wherein said memory means rewrites the stored data with only the latest focus controlling signal generated by said memory controlling means.

21. An apparatus according to any one of claims 1, 5, 6, 7, 9, 14, and 15, wherein when said focus controlling signal generating means generates the inoperative signal before the first focus controlling signal is output, said photographing lens driving means drives said photographing lens on the basis of a predetermined value.

* * * * *